(12) United States Patent
Schmeichel

(10) Patent No.: US 8,056,955 B1
(45) Date of Patent: Nov. 15, 2011

(54) TRAILER TARP COVER SYSTEM

(75) Inventor: Jay A. Schmeichel, Bismarck, ND (US)

(73) Assignee: Bismarck Canvas, Inc., Bismarck, ND (US)

( * ) Notice: Subject to any disclaimer, the term of this patent is extended or adjusted under 35 U.S.C. 154(b) by 40 days.

(21) Appl. No.: 12/795,307

(22) Filed: Jun. 7, 2010

(51) Int. Cl.
*B60P 7/04* (2006.01)

(52) U.S. Cl. ..................................... 296/98; 296/100.14

(58) Field of Classification Search .............. 296/98, 296/100.01, 100.14
See application file for complete search history.

(56) References Cited

U.S. PATENT DOCUMENTS

| | | | |
|---|---|---|---|
| 6,199,935 B1 | 3/2001 | Waltz et al. | |
| 6,206,449 B1 | 3/2001 | Searfoss | |
| 6,318,790 B1 | 11/2001 | Henning | |
| 6,513,856 B1 | 2/2003 | Swanson et al. | |
| 6,575,519 B2 | 6/2003 | Henning | |
| 6,893,071 B2 | 5/2005 | Chabot | |
| 6,942,274 B2 | 9/2005 | Henning | |
| 6,974,176 B2 * | 12/2005 | Smith et al. | 296/98 |
| 7,111,891 B2 | 9/2006 | O'Brian et al. | |
| 7,350,846 B2 * | 4/2008 | Smith | 296/100.01 |
| 7,513,561 B2 | 4/2009 | Royer | |
| 7,726,720 B2 * | 6/2010 | Searfoss | 296/100.01 |
| 2002/0014779 A1 | 2/2002 | Henning | |
| 2002/0145304 A1 | 10/2002 | Henning | |
| 2004/0056505 A1 * | 3/2004 | Smith | 296/98 |
| 2004/0135392 A1 | 7/2004 | Chabot | |
| 2005/0242612 A1 | 11/2005 | O'Brian et al. | |
| 2008/0217952 A1 | 9/2008 | Royer | |
| 2010/0038925 A1 | 2/2010 | Conner | |

* cited by examiner

*Primary Examiner* — Glenn Dayoan
*Assistant Examiner* — Gregory Blankenship
(74) *Attorney, Agent, or Firm* — Antoinette M. Tease

(57) ABSTRACT

A trailer tarp cover system comprising a main arm, a rectangular joint, a gas spring, and a motor located on the distal end of the main arm. In a first embodiment, the rectangular joint is comprised of the bottom portion of the main arm, two axle support members, two first support members, and two second support members. In a second embodiment, the rectangular joint is comprised of the bottom portion of the main arm, two axle support members, one first support member, and one second support member. In an alternate embodiment, torsion springs are used in lieu of the gas spring.

4 Claims, 20 Drawing Sheets

TRAILER TARP COVER SYSTEM

BACKGROUND OF THE INVENTION

1. Field of the Invention

The present invention relates generally to the field of trailer covers, and more specifically, to a trailer tarp cover system that uses a main arm with a rectangular joint at its base to open and close the cover.

2. Description of the Related Art

The present invention is a side-to-side tarp cover system for a grain trailer of the type shown in FIG. 1. There exist a number of side-to-side tarp cover systems for grain trailers, some of which are manually operated and others of which are electronically operated. Among the electronically operated tarp cover systems are those depicted in U.S. Pat. Nos. 6,199,935, 6,206,449 and 6,513,856, discussed below. An example of a manually operated side-to-side tarp system is described in U.S. Pat. No. 7,513,561, also discussed below. None of these systems utilizes a rectangular joint at the base of the main arm, as in the present invention. The rectangular joint of the present invention provides mechanical advantages not present in the inventions discussed below.

U.S. Pat. No. 6,199,935 (Waltz et al., 2001) discloses a flexible sheet cover apparatus for a load-carrying box on a land vehicle in which an arm is coupled to a roller for rolling and unrolling the flexible sheet from side to side. The arm is in the form of a box beam with a fixed length, and the arm has a slot. A pin is coupled to the load-carrying box and slidably engaged in the slot in the arm to define a pivot for the arm. The roller remains in constant contact with the top edges of the two non-contiguous walls that form the load-carrying box. A motor is fixed to the arm between the roller and the slot, and a drive unit enclosed within the box beam couples the motor to the roller.

U.S. Pat. No. 6,206,449 (Searfoss, 2001) provides an apparatus for extending and retracting a cover over a bed of a truck. The main arm, which is located at the rear of the truck bed, has a first base and a first extension. The bearing arm, which is located at the front of the truck bed, has a second base and a second extension. The first extension is pivotally connected to the upper end of the first base, and the second extension is pivotally connected to the upper end of the second base. A reel extends between distal ends of the first and second extensions. A motor is mounted on the distal end of either the first or second extension and is also connected to the distal end of the reel.

U.S. Pat. No. 6,513,856 (Swanson et al., 2003) involves a mechanism for rolling and unrolling a tarp over a trailer container. An electrically operated drive assembly is used to roll the roll bar back and forth between longitudinal edges of the container. The drive assembly comprises an electric motor and a gear reduction mechanism, both of which are supported on a telescoping tube assembly that is pivotably attached to the front of the container. A double reel member is fixedly attached to the forward end of the roll bar, and a single reel member is fixedly attached to the rearward end of the roll bar. Constant force spring members are fixedly attached to the double and single reel members and also to hinge plates mounted on the side of the container.

U.S. Pat. No. 7,513,561 (Royer, 2009) discloses a device for covering and uncovering the top of a container with a tarp, the device comprising a rod, a rod rotating component, and an actuator. The tarp is rolled around the rod when the cover is in a retracted position, and the rod rotating component is couple to the rod such that rotating the rod rotating component around its longitudinal axis also rotates the rod around its longitudinal axis. The rod rotating component is linked to an actuator that is operated manually and that causes the rod rotating component to rotate about its longitudinal axis. The length of the rod rotating component varies to allow the rod to remain linked to the actuator as the rod travels over the top of the container.

Examples of tarp covering systems that involve front-to-back rather than side-to-side retraction and extension systems include: U.S. Pat. No. 7,111,891 (O'Brian et al., 2006); U.S. Pat. No. 6,893,071 (Chabot, 2005); U.S. Pat. No. 6,318,790 (Henning, 2001); U.S. Pat. No. 6,942,274 (Henning, 2005); and U.S. Pat. No. 6,575,519 (Henning, 2003).

BRIEF SUMMARY OF THE INVENTION

The present invention is a trailer tarp cover system comprising: a main arm with a distal end and a bottom portion; a rectangular joint comprised of the bottom portion of the main arm, two axle support members each having two ends, two first support members each having two ends, and two second support members each having two ends; a gas spring having two ends; and a motor located on the distal end of the main arm and having a motor shaft that is connected to a tarp roll bar; wherein the two first support members are roughly horizontally parallel to one another and are pivotally attached to the bottom portion of the main arm on one end and to the two axle support members on the other end; wherein the two second support members are roughly horizontally parallel to one another and are pivotally attached to the bottom portion of the main arm on one end and to the two axle support members on the other end; wherein the two axle support members are horizontally parallel to one another and are pivotally attached to one of the two first support members on one end and to one of the two second support members on the other end; wherein the axle support members are vertically parallel to the main arm; wherein the two first support members are the same length as and vertically parallel to the two second support members; wherein the gas spring is attached to one of the two axle support brackets on one end and to a main bracket on the other end; wherein the main bracket is attached to a trailer; and wherein an axle extends through both axle support members and is welded to an axle support bracket that is fixedly attached to the main bracket.

In an alternate embodiment, the present invention is a trailer tarp cover system comprising: a main arm with a distal end and a bottom portion; a rectangular joint comprised of the bottom portion of the main arm, two axle support members each having two ends, two first support members each having two ends, and two second support members each having two ends; one or more torsion springs each having two ends; and a motor located on the distal end of the main arm and having a motor shaft that is connected to a tarp roll bar; wherein the two first support members are roughly horizontally parallel to one another and are pivotally attached to the bottom portion of the main arm on one end and to the two axle support members on the other end; wherein the two second support members are roughly horizontally parallel to one another and are pivotally attached to the bottom portion of the main arm on one end and to the two axle support members on the other end; wherein the two axle support members are horizontally parallel to one another and are pivotally attached to one of the two first support members on one end and to one of the two second support members on the other end; wherein the axle support members are vertically parallel to the main arm; wherein the two first support members are the same length as and vertically parallel to the two second support members; wherein the main bracket is attached to a trailer; wherein an axle extends through both axle support members and is welded to an axle support bracket that is fixedly attached to the main bracket; wherein the torsion springs are mounted on the axle between the two axle support members; and wherein one end of each torsion spring member is secured to the axle and the other end of each torsion spring member wraps around a spacer located between the two axle support members.

In yet another alternate embodiment, the present invention is a trailer tarp cover system comprising: a main arm with a distal end and a bottom portion; a rectangular joint comprised of the bottom portion of the main arm, two axle support members each having two ends, a first support member with a first end and a second end, and a second support member with a first end and a second end; a gas spring having two ends; and a motor located on the distal end of the main arm and having a motor shaft that is connected to a tarp roll bar; wherein the first end of the first support member is pivotally attached to the bottom portion of the main arm, and the second end of the first support member is pivotally attached to the two axle support members; wherein the first end of the second support member is pivotally attached to the bottom portion of the main arm, and the second end of the second support member is pivotally attached to the two axle support members; wherein the two axle support members are horizontally parallel to one another and are pivotally attached to the second end of the first support member on one end and to the second end of the second support member on the other end; wherein the axle support members are vertically parallel to the main arm; wherein the first support member is the same length as and vertically parallel to the second support member; wherein the gas spring is attached to one of the two axle support brackets on one end and to a main bracket on the other end; wherein the main bracket is attached to a trailer; and wherein an axle extends through both axle support members and is welded to an axle support bracket that is fixedly attached to the main bracket.

In yet another alternate embodiment, the present invention is a trailer tarp cover system comprising: a main arm with a distal end and a bottom portion; a rectangular joint comprised of the bottom portion of the main arm, two axle support members each having two ends, a first support member with a first end and a second end, and a second support member with a first end and a second end; one or more torsion springs each having two ends; and a motor located on the distal end of the main arm and having a motor shaft that is connected to a tarp roll bar; wherein the first end of the first support member is pivotally attached to the bottom portion of the main arm, and the second end of the first support member is pivotally attached to the two axle support members; wherein the first end of the second support member is pivotally attached to the bottom portion of the main arm, and the second end of the second support member is pivotally attached to the two axle support members; wherein the two axle support members are horizontally parallel to one another and are pivotally attached to the second end of the first support member on one end and to the second end of the second support member on the other end; wherein the axle support members are vertically parallel to the main arm; wherein the first support member is the same length as and vertically parallel to the second support member; wherein the main bracket is attached to a trailer; wherein an axle extends through both axle support members and is welded to an axle support bracket that is fixedly attached to the main bracket; wherein the torsion springs are mounted on the axle between the two axle support members; and wherein one end of each torsion spring member is secured to the axle and the other end of each torsion spring member wraps around a spacer located between the two axle support members.

| REFERENCE NUMBERS | |
| --- | --- |
| 1 | Main arm |
| 1a | Bottom portion (of main arm) |
| 2 | Rectangular joint |
| 3 | Motor housing |
| 4 | Trailer |
| 5 | Tarp cover |
| 6 | Adapter tube |
| 7 | Roll bar |
| 8 | Bolt |

-continued

| REFERENCE NUMBERS | |
|---|---|
| 9 | Cleat |
| 10a | Axle support member |
| 10b | Axle support member |
| 11a | First support member |
| 11b | First support member |
| 12a | Second support member |
| 12b | Second support member |
| 13 | Axle |
| 14 | Axle support bracket |
| 15 | Main bracket |
| 16 | Gas spring |
| 17 | Pivot point |
| 18 | Electrical conduit |
| 19 | Extension (for attachment of gas spring) |
| 20 | Collar |
| 21 | Spacer |
| 22 | Torsion spring |
| 23 | Upward leg (of cleat) |
| 24 | Inner end (of torsion spring) |
| 25 | Notch (in axle) |
| 26 | Outer end (of torsion spring) |
| 27 | Pin |
| 28 | Clip |
| 29 | First support member (alternate embodiment) |
| 30 | Second support member (alternate embodiment) |

DETAILED DESCRIPTION OF INVENTION

Figure 1:
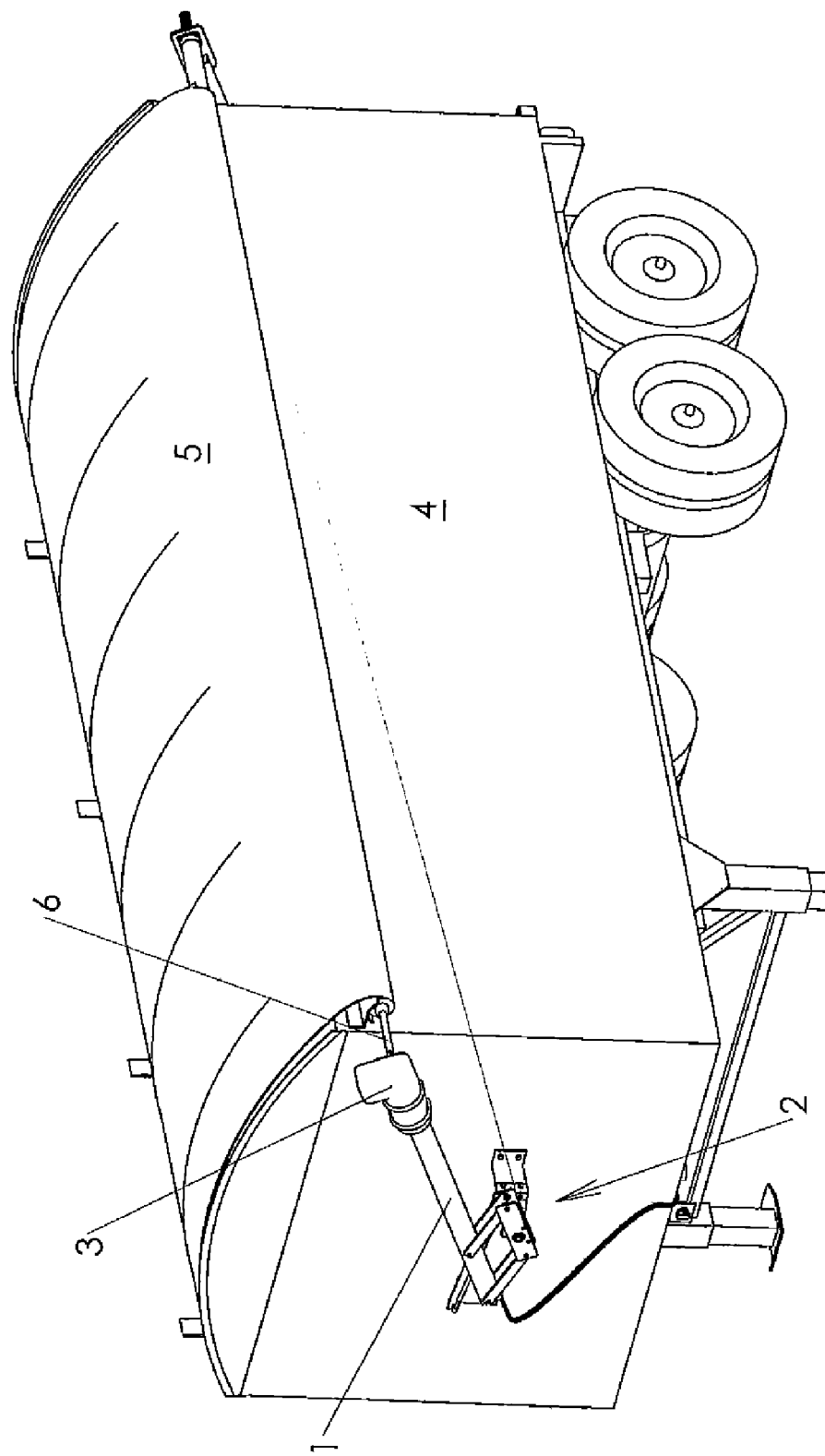
FIG. 1 is a front perspective view of a hopper bottom grain trailer with the tarp cover system of the present invention installed on it and the tarp cover in a closed position.

FIG. 1 is a front perspective view of a hopper bottom grain trailer with the tarp cover system of the present invention installed on it and the tarp cover in a closed position. As shown in this figure, the present invention comprises a main arm 1 with a rectangular joint 2 at its base and a motor housing 3 at its distal end. The rectangular joint 2 allows the main arm 1 to extend up and over the top of the trailer 4 and to retract, as necessary. Although the present invention is shown with a hopper bottom grain trailer, the present invention may be used in connection with any type of trailer of sufficient size with a retractable tarp cover.

Figure 13:
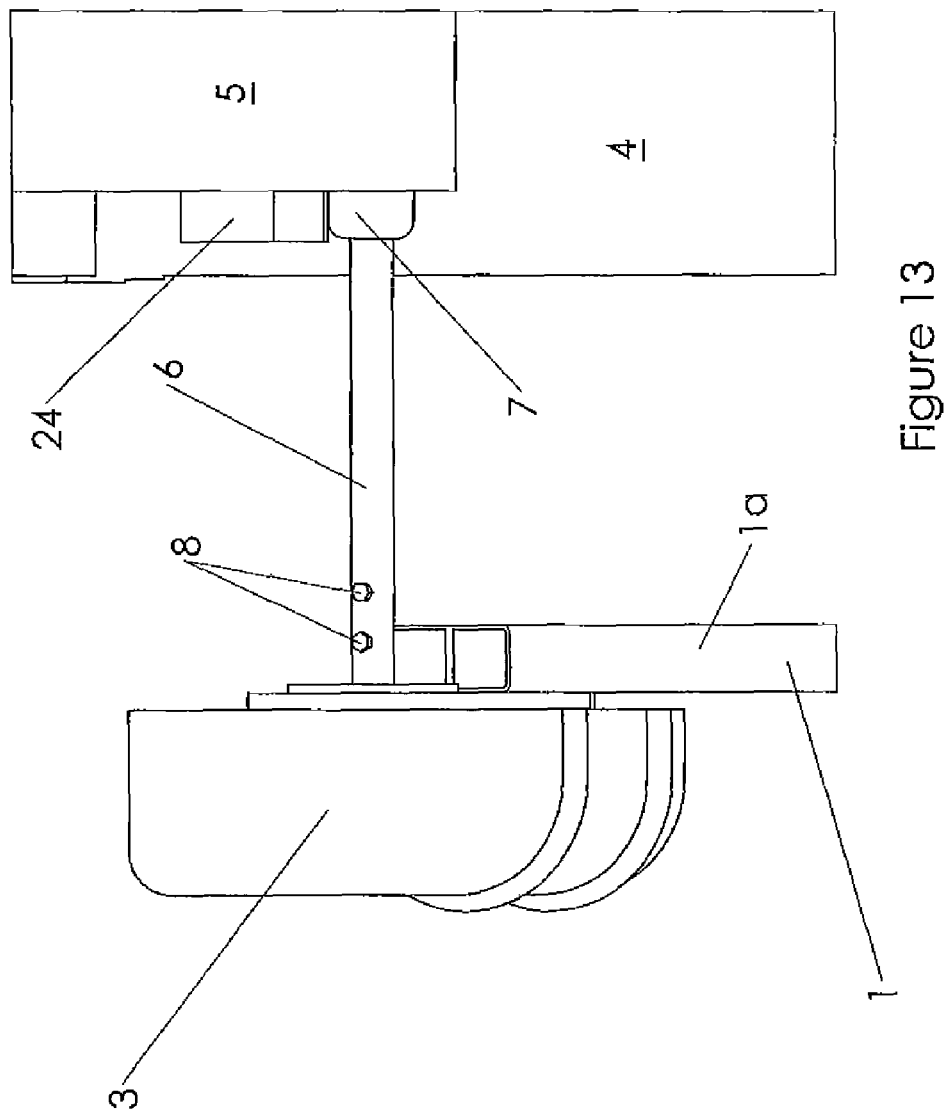
FIG. 13 is a detail view of the motor housing and roll bar of the present invention.

The motor housing 3 houses an electric motor (not shown) and a mechanical gear box (not shown). Referring to FIG. 13, a motor shaft (not shown) is attached to an adapter tube 6 with bolts 8, and the adapter tube 6 is welded to the roll bar 7 such that when the motor shaft rotates, the roll bar 7 also rotates. The tarp cover 5 is fixedly attached to the roll bar 7 so that as the electric motor causes the motor shaft, adapter tube 6 and roll bar 7 to rotate, the tarp cover 5 is either rolled or unrolled around the roll bar 7, depending on the direction of rotation of the roll bar 7. The electric motor is preferably controlled with a remote control device (not shown), but it could also be controlled with a manual switch (not shown).

Figure 2:
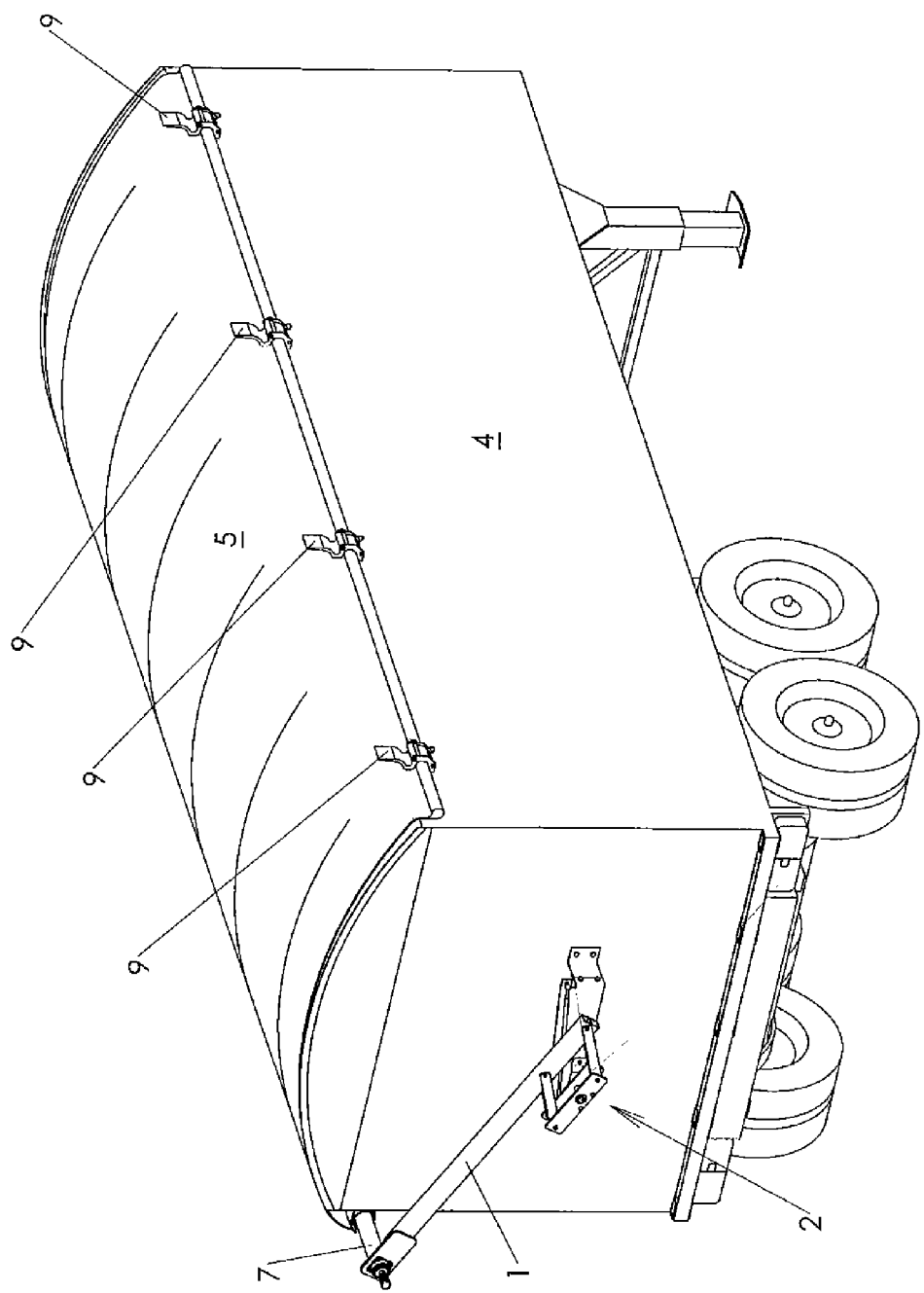
FIG. 2 is a rear perspective view of a hopper bottom grain trailer with the tarp cover system of the present invention installed on it and the tarp cover in a closed position.

FIG. 2 is a rear perspective view of a hopper bottom grain trailer with the tarp cover system of the present invention installed on it and the tarp cover in a closed position. As shown in this figure, a main arm 1 with a rectangular joint 2 at its base is also installed on the rear of the trailer 4 and is a mirror image of the main arm 1 and rectangular joint 2 installed on the front of the trailer 4. On one side of the trailer 4, the tarp cover 5 is preferably removably secured to the top of the grain trailer 4 with cleats 9 (see FIG. 18).

Figure 3:
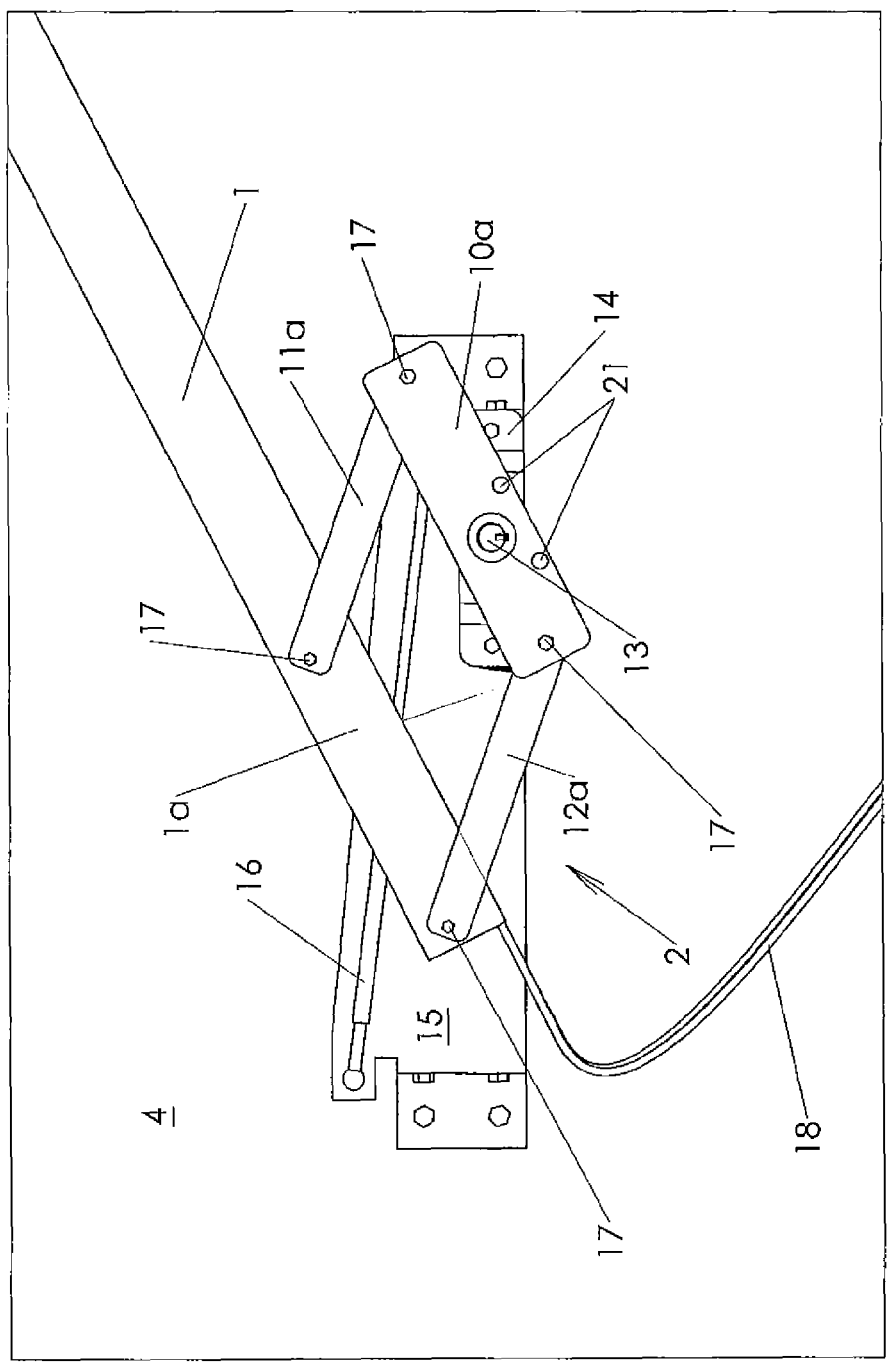
FIG. 3 is a front view of the rectangular joint on the front of the trailer.

FIG. 3 is a front view of the rectangular joint 2 on the front of the trailer 4. In this figure, the tarp cover 5 is in the same position as that shown in FIG. 1. The rectangular joint 2 is comprised of the bottom portion 1a of the main arm 1, two axle support members 10a and 10b (10b not shown), two first support members 11a and 11b (11b not shown), and two second support members 12a and 12b (12b not shown). The two first support members 11a, 11b are attached to the outside of the bottom portion 1a of the main aim 1 on one end and to the inside of the two axle support members 10a, 10b on the other end. The two first support member 11a, 11b are roughly horizontally parallel to one another, which is why only one of the first support members 11a is visible in FIG. 3. The two second support members 12a, 12b are attached to the outside of the bottom portion 1a of the main arm 1 on one end and to the inside of the two axle support members 10a, 10b on the other end. As with the two first support members 11, 11b, the two second support members 12a, 12b are roughly horizontally parallel to one another, which is why only one of the second support members 12a is visible in FIG. 3.

Although the two first support members are shown as being exactly horizontally parallel to each other in the figures, in the embodiment involving the torsion springs (described below), it is possible that the distance between the ends of the two first support members 11a, 11b where they attach to the axle support members 10 a, 10b could be slightly greater than the distance between the ends of the two first support members 11a, 11b where they attach to the bottom portion 1a of the main arm 1 in order to accommodate the width of the torsion springs 22 on the axle 13. The same statement is true of the second support members.

Note also that the point at which the first support members 11a, 11b attach to the bottom portion 1a of the main arm 1 is closer to the distal end of the main arm (to which the motor housing 3 is attached) than the point at which the two second support members 12 a, 12b attach to the bottom portion 1a of the main arm 1. The distance between these two points will be referred to herein as "X."

Each axle support member 10a, 10b is attached on one end to a first support member 11a, 11b and on the other end to a second support member 12a, 12b. More specifically, axle support member 10a is attached on one end to first support member 11a and one the other end to second support member 12a. Axle support member 10b is attached on one end to first support member 11b and on the other end to second support member 12b. The two axle support members 10a, 10b are horizontally parallel to one another, which is why only one axle support member 10a is visible in FIG. 3. They are also vertically parallel to the main arm 1. The support members 11a, 11b, 12a, 12b connect the axle support members 10a, 10b to the main arm 1. This configuration allows the force applied to the axle support members 10a, 10b by the gas spring 16 or torsion springs 22 to be transferred to the main arm 1. The axle 13 extends through both axle support members 10a, 10b and is welded to an axle support bracket 14, which in turn is fixedly attached to the main bracket 15. The main bracket 15 is fixedly attached to the front of the trailer 4.

In order for the rectangular joint to function, each point of attachment between the bottom portion 1a of the main arm 1 and the first and second support members 11a, 11b, 12a, 12b, and each point of attachment between the axle support members 10a, 10b and the first and second support members 11a, 11b, 12a, 12b, is a pivot point 17. The first support members 11a, 11b are the same length as the second support members 12a, 12b. On each axle support member 10a, 10b, the distance between the point at which the axle support member 10a, 10b attaches to the first support member 11a, 11b and the point at which the axle support member 10a, 10b attaches to the second support member 12a, 12b will be referred to herein as "Y."

In order for the rectangular joint to function properly, distance "X" (defined above) must equal distance "Y." (In other words, the two first support member 11a, 11b are vertically parallel to the two second support members 12a, 12b.) In this manner, the bottom portion 1a of the main arm 1, the first support members 11a, 11b, the second support members 12a, 12b, and the axle support members 10a, 10b always form a perfect rectangle.

Figure 4:
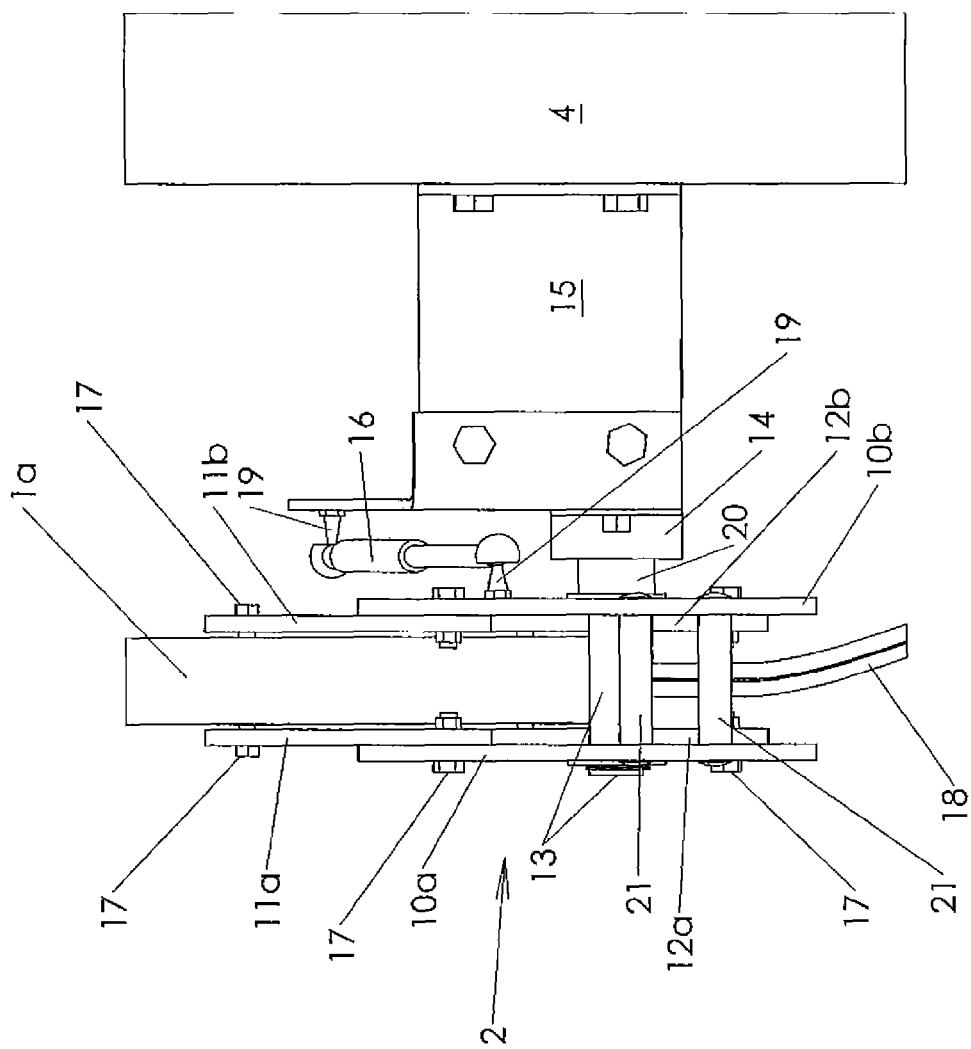
FIG. 4 is a right side view of the rectangular joint on the front of the trailer.

In a preferred embodiment, a gas spring 16 is used to create a smoother movement of the main arm 1 and to cushion the extension and retraction of the main arm 1 as it travels across the top of the grain trailer 4 from one end to the other. As shown in FIG. 4, the gas spring 16 is attached on one end to the bracket 15 and on the other end to the outer face of axle support bracket 10b. In an alternate embodiment (see FIGS. 14-17), a plurality of torsion springs is used in lieu of the gas spring 16.

The same configuration described above applies to the rectangular joint 2 on the rear of the trailer 4, although it is the mirror opposite of the rectangular joint 2 on the front of the trailer 4, with the exception of the electrical conduit 18. FIG. 3 shows the electrical conduit 18 through which the electrical wiring (not shown) is connected to the electric motor (not shown). There is no electrical conduit 18 in the rectangular joint 2 on the rear of the trailer 4 because the motor is located only on the front end of the trailer. In an alternate embodiment, the motor could be located on the rear end of the trailer.

FIG. 4 is a right side view of the rectangular joint on the front of the trailer. This figure clearly shows the two extensions 19 that are used for attachment of the gas spring 16; one extension 19 is attached to and extends from the main bracket 15, and the other extension 19 is attached to and extends from the outer face of axle support bracket 10b. This view also shows the first support members 11a, 11b and second support members 12a, 12b in relation to one another. It also shows the axle support members 10a, 10b in relation to both the first and second support members 11a, 11b, 12a, 12b and the bottom portion 1a of the main arm 1.

As mentioned above, the axle 13 extends through both of the axle support members 10a, 10b and is then welded to the axle support bracket 14, which is preferably bolted to the main bracket 15. Two spacers 21 lie between the two axle support members 10a, 10b and are slightly greater in width than the main arm 1. (The location of the spacers is indicated with reference number 21 in FIG. 3, although the references lines are technically pointing to the bolt heads and not to the spacers themselves.) A collar 20 encircles the axle and lies between the outer face of axle support bracket 10b and the axle support bracket 14.

Figure 5:
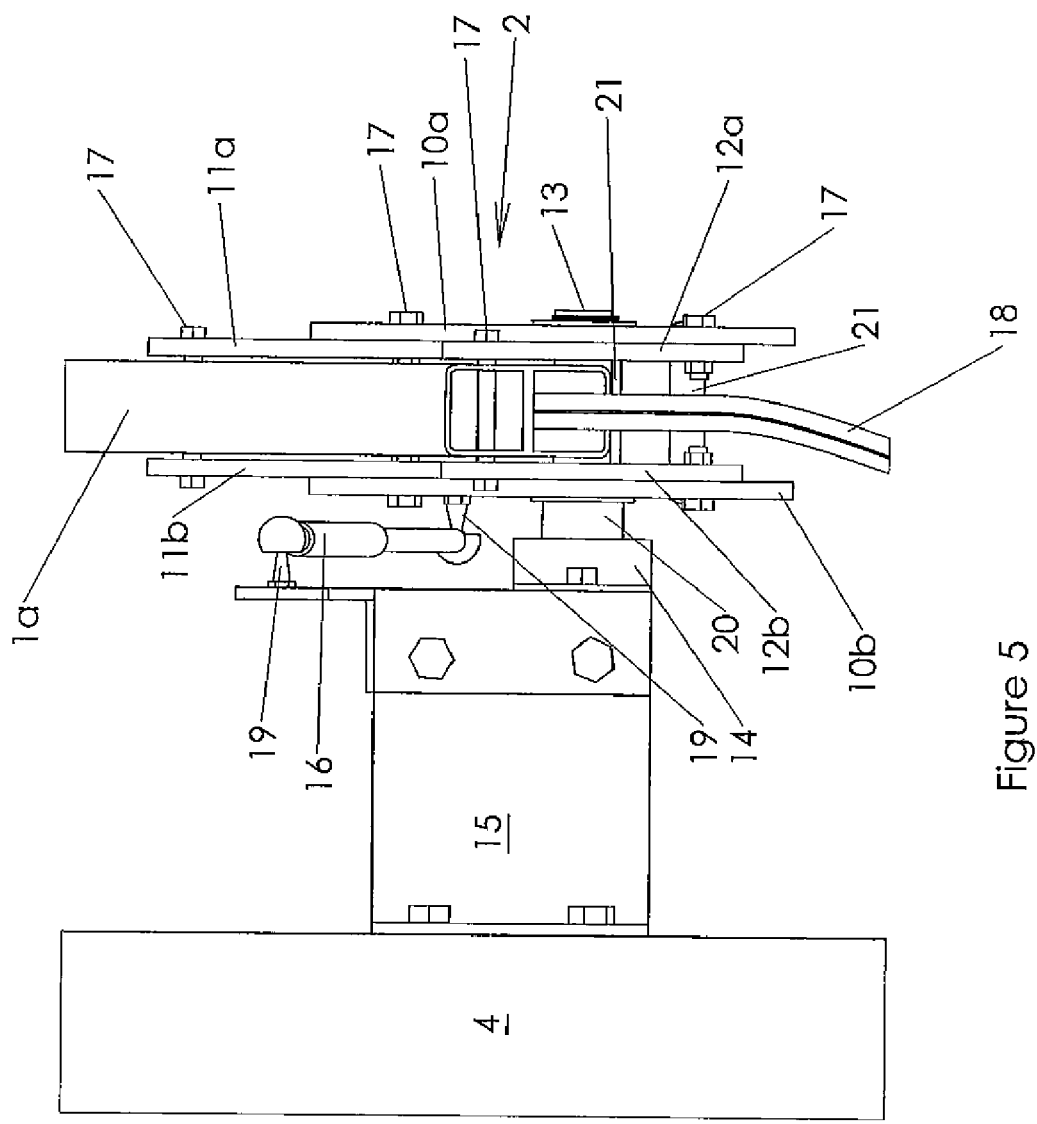
FIG. 5 is a left side view of the rectangular joint on the front of the trailer.

FIG. 5 is a left side view of the rectangular joint on the front of the trailer. To convert from the gas spring embodiment to the torsion spring embodiment, the gas spring 16 is simply pulled off of the extensions 19, and the torsion springs 22 are inserted onto the axle 13 (see FIGS. 15 and 17) between the inner faces of the two axle support members 10a, 10b.

Figure 6:
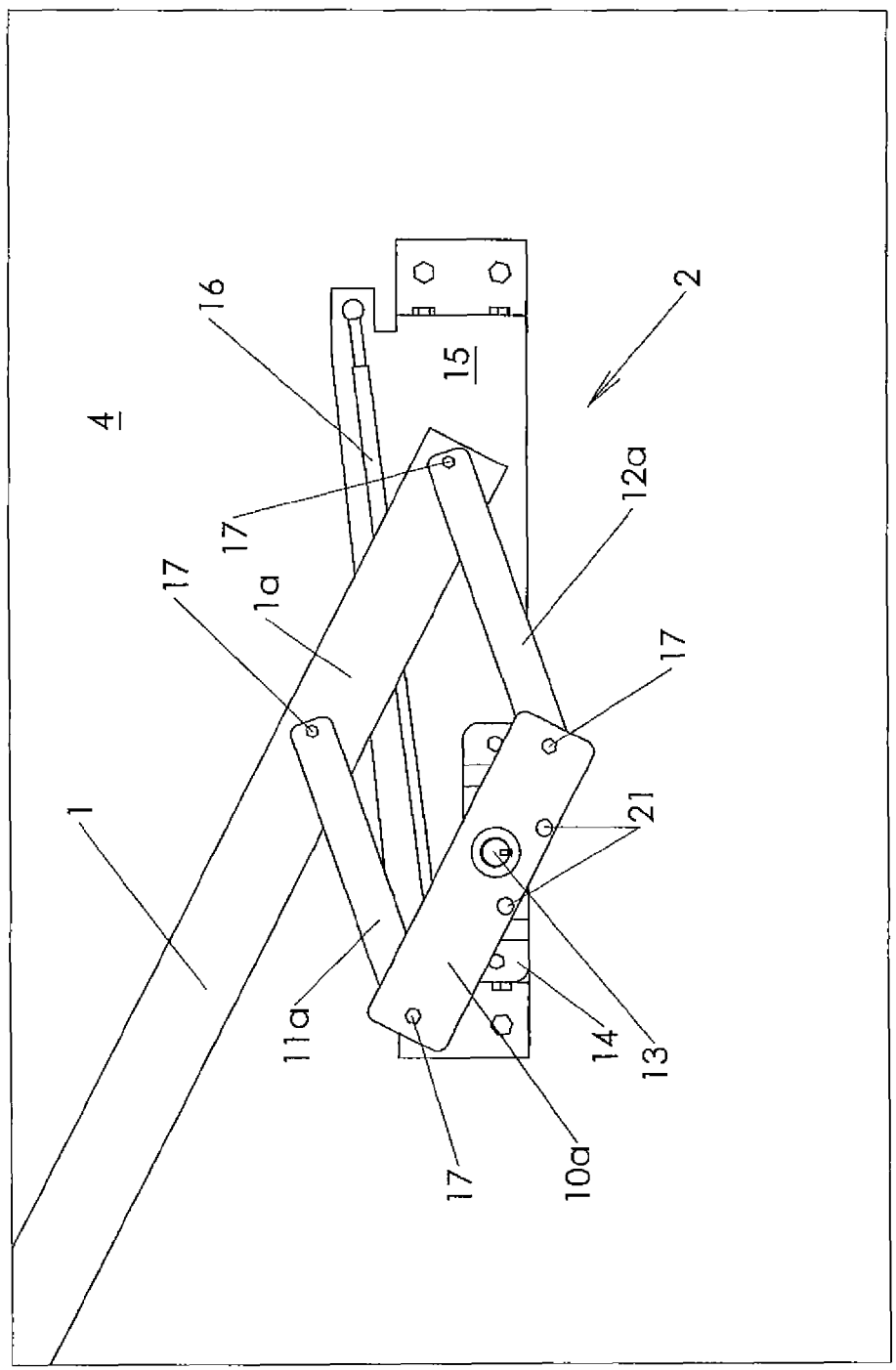
FIG. 6 is a front view of the rectangular joint on the rear of the trailer.

FIG. 6 is a front view of the rectangular joint on the rear of the trailer. This figure is identical to FIG. 3 except that the rectangular joint 2 is a mirror image of the rectangular joint 2 on the front of trailer. In addition, there is no electrical conduit 18 because there is no motor on the rear of the trailer.

Figure 7:
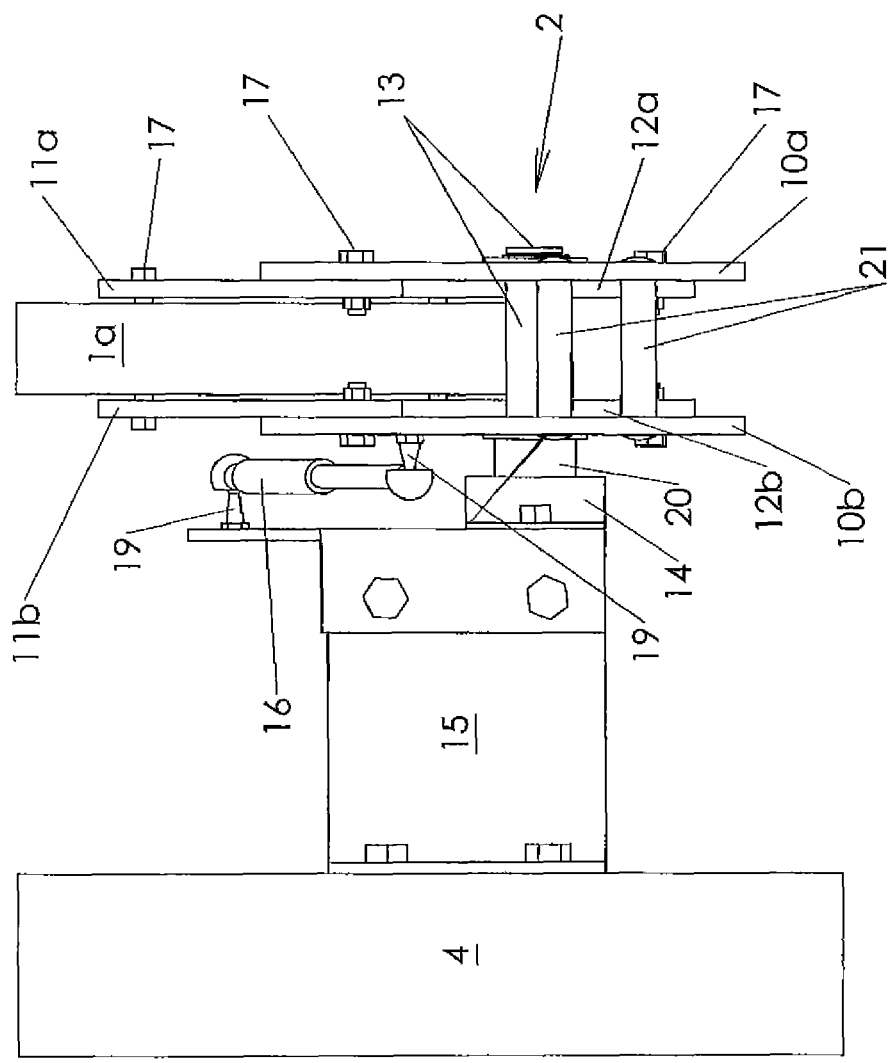
FIG. 7 is a right side view of the rectangular joint on the rear of the trailer.

FIG. 7 is a right side view of the rectangular joint on the rear of the trailer. As used herein, the term "right side" refers to the right side of the trailer as one is standing in front of the trailer; therefore, the view shown in FIG. 7 is actually the left side of the rectangular joint 2 on the rear of the trailer as one is standing behind the trailer. The view shown in this figure is a mirror image of that shown in FIG. 4, with the exception of the electrical conduit 18.

Figure 8:
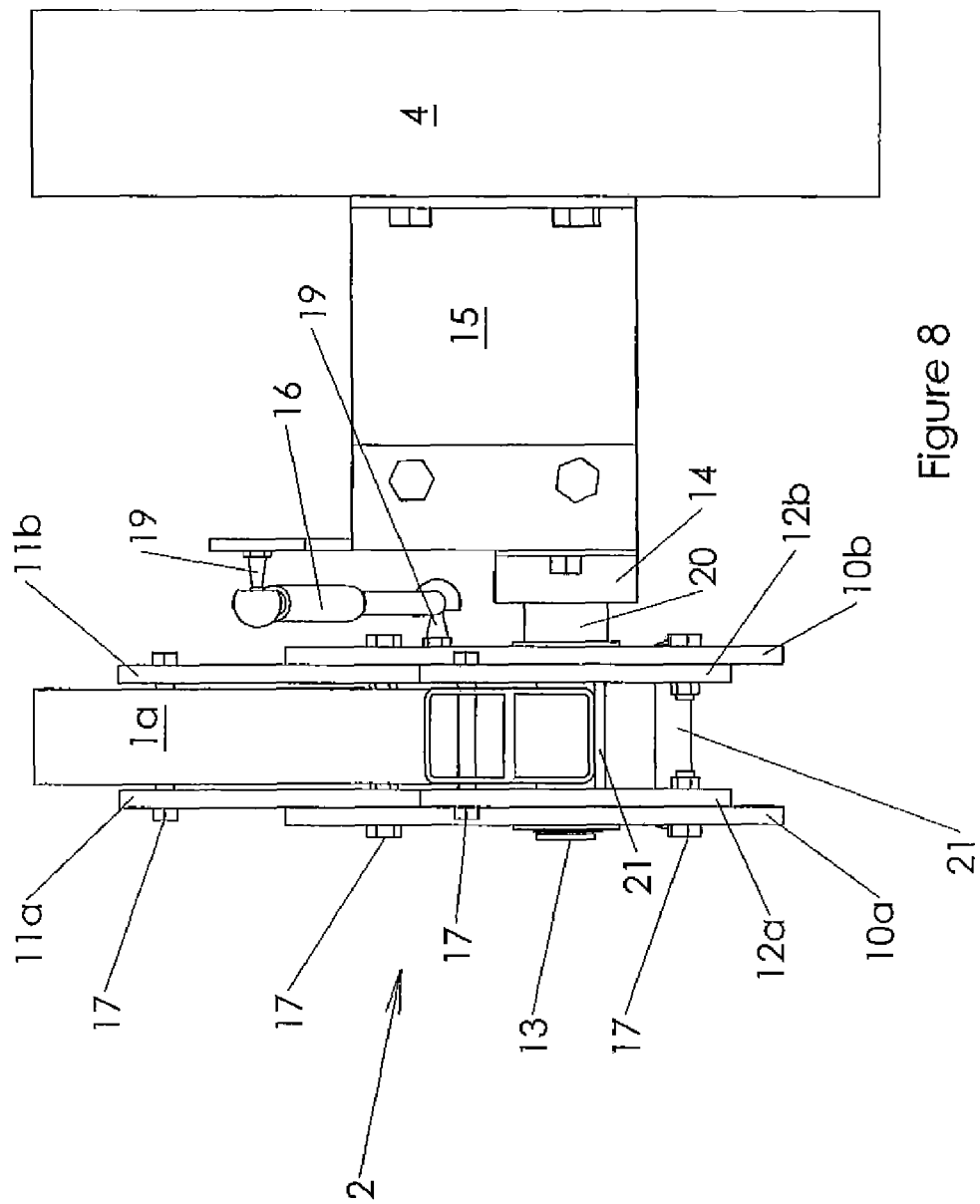
FIG. 8 is a left side view of the rectangular joint on the rear of the trailer.

FIG. 8 is a left side view of the rectangular joint on the rear of the trailer (i.e., it is actually the right side view from the perspective of one standing behind the trailer). The view shown in this figure is a mirror image of that shown in FIG. 5, with the exception of the electrical conduit 18.

Figure 9:
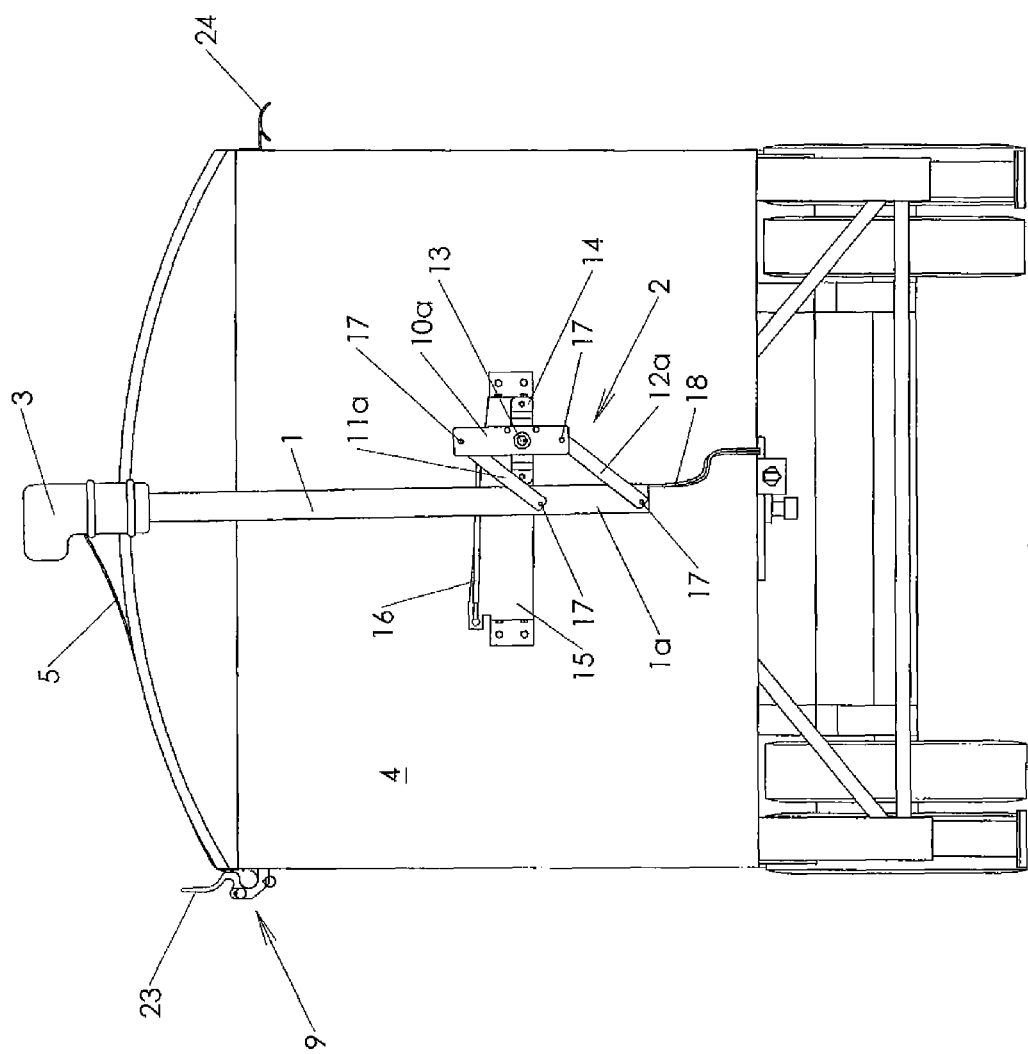
FIG. 9 is a front view of the tarp cover system of the present invention installed on the front of a hopper bottom grain trailer with the tarp cover partially retracted.

In all of FIGS. 1-8, the tarp is in a closed position; that is, the main arm 1 is shown in the position it would be in if the tarp cover 5 were fully closed (see FIG. 1). In FIG. 9, the main arm 1 has been moved (i.e., the electric motor turned on and the roll bar 7 rotated) so that it is at the mid-way point over the top of the trailer 4; in this position, the tarp cover 5 has been partially rolled around the roll bar 7. In a preferred embodiment, the distal end of the main arm 1 (i.e., the end with the motor housing 3 on it), rises several inches above the top of the trailer 4 so as to clear any load that may be inside the trailer 4.

The cleat 9 (see FIG. 18) serves a dual purpose. One purpose, mentioned above, is to fixedly secure the tarp cover 5 on one side of the trailer 4. The other purpose is to serve as a stopping point for the tarp cover 5 in its fully retracted position. In other words, when the roll bar 7 hits the upward leg 23 of the cleat 9, then the operator must take his hand off the remote control button or his finger off of the motor switch to cause the motor to stop. (Future embodiments may include a sensor that causes the motor to stop automatically at this point.) When the tarp cover 5 is in a fully closed position, the roll bar 7 rests underneath the ledge 24 provided for this purpose on the opposite side of the trailer 4 (see also FIG. 20).

Figure 10:
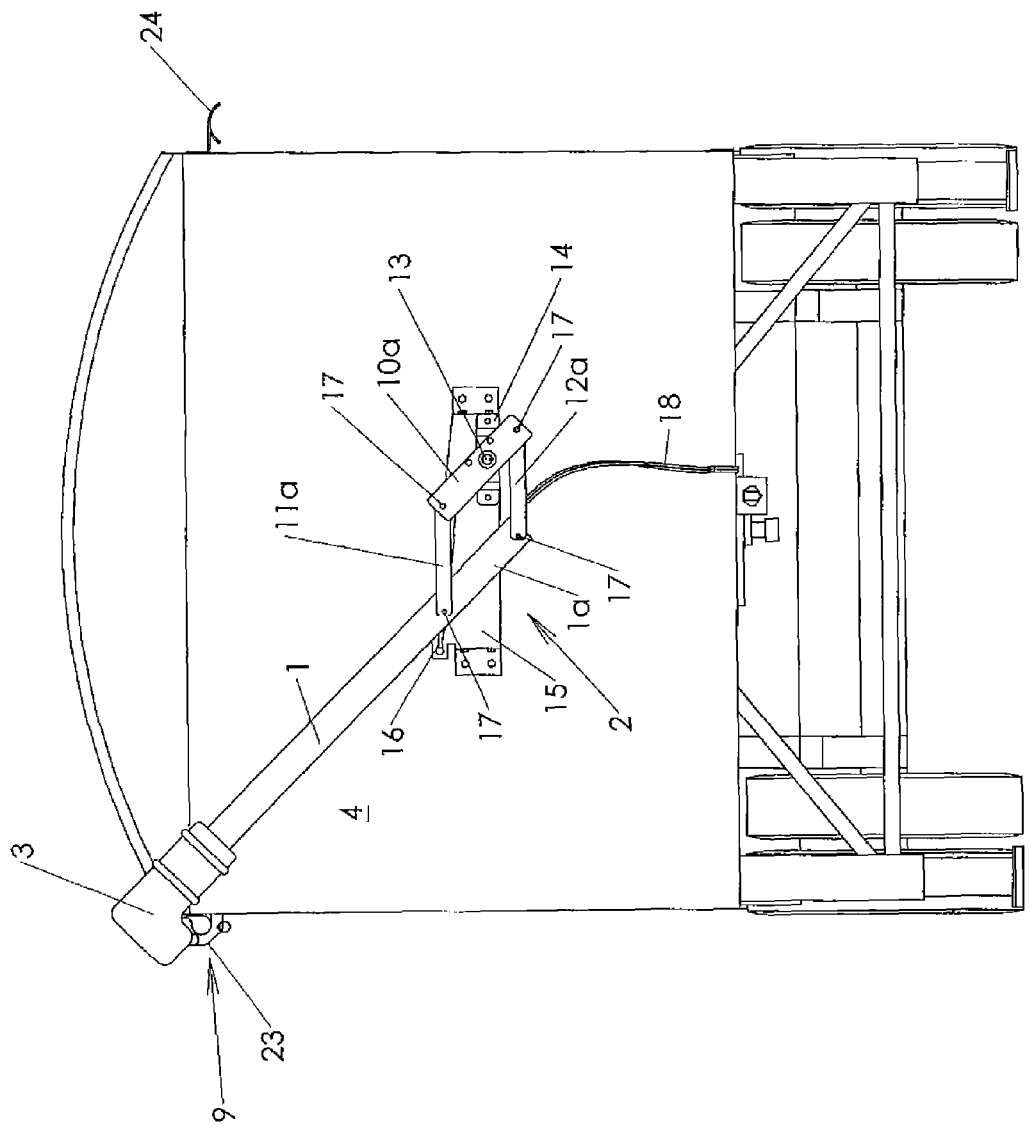
FIG. 10 is a front view of the tarp cover system of the present invention installed on the front of a hopper bottom grain trailer with the tarp cover fully retracted.

FIG. 10 is a front view of the tarp cover system of the present invention installed on the front of a hopper bottom grain trailer with the tarp cover fully retracted.

Figure 11:
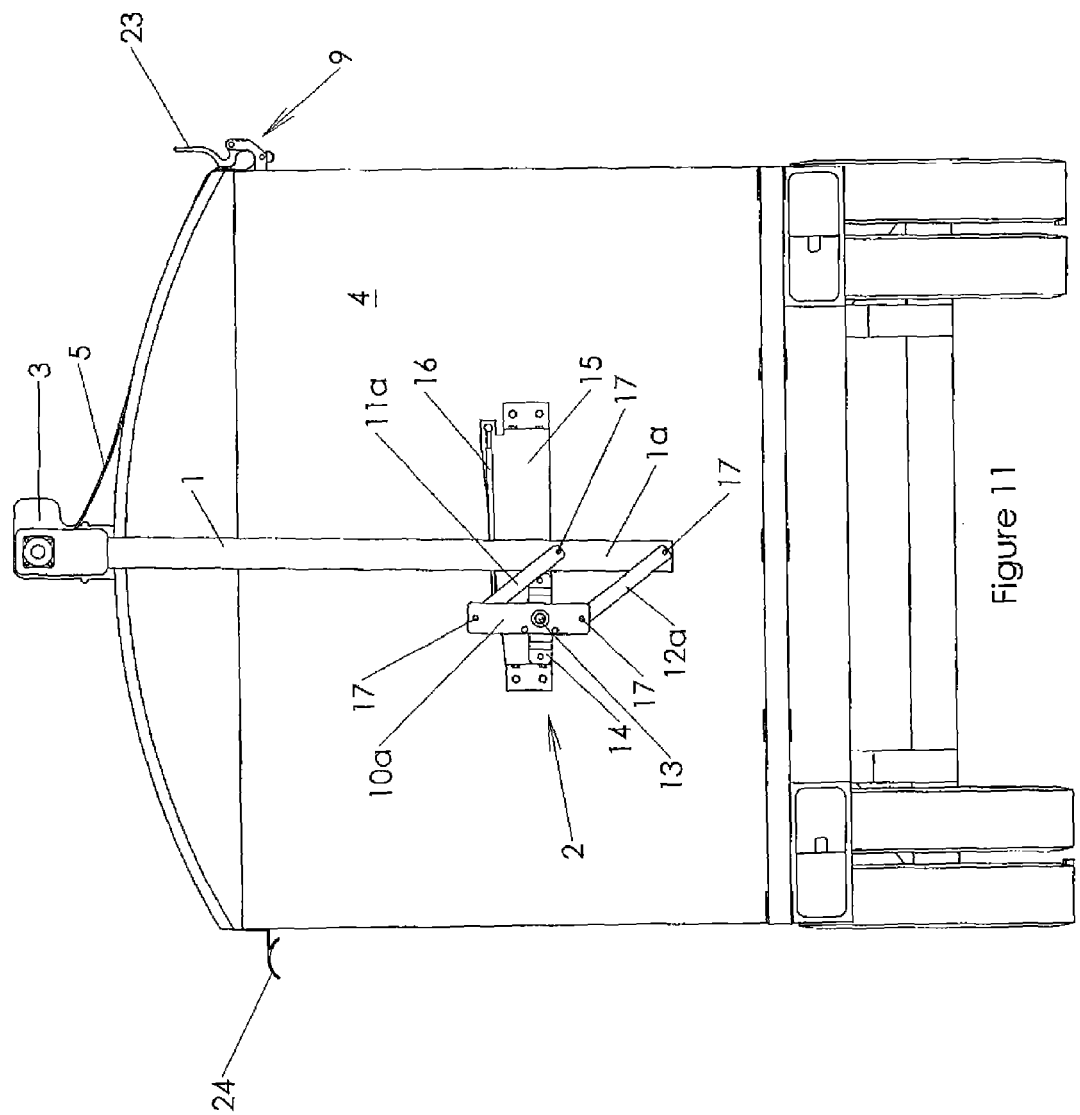
FIG. 11 is a rear view of the tarp cover system of the present invention installed on the rear of a hopper bottom grain trailer with the tar cover partially retracted.
Figure 12:
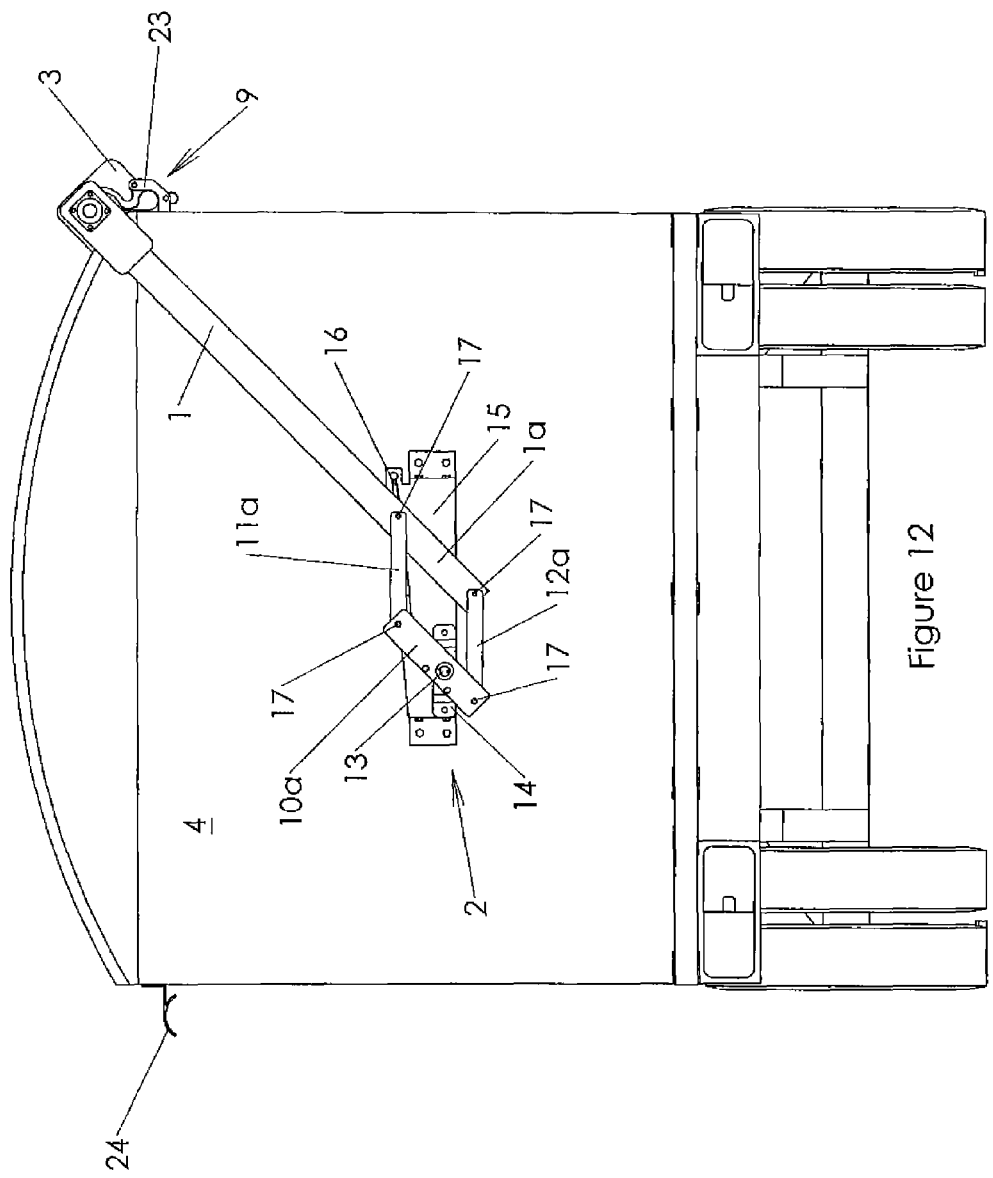
FIG. 12 is a rear view of the tarp cover system of the present invention installed on the rear of a hopper bottom grain trailer with the tarp cover fully retracted.

FIGS. 11 and 12 are rear views of the tarp cover system of the present invention installed on the rear of a hopper bottom grain trailer with the tarp cover partially retracted and fully retracted, respectively.

Figure 14:
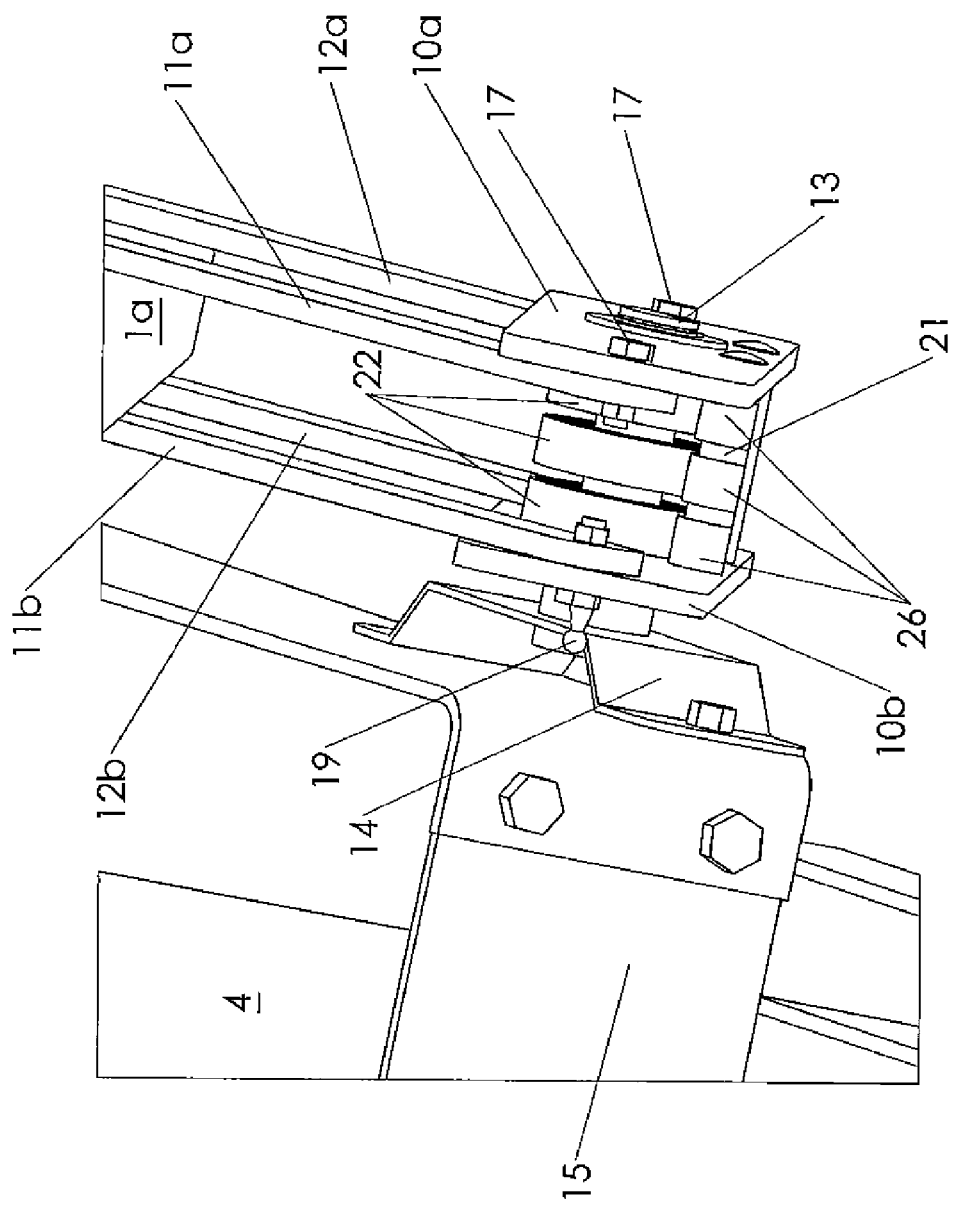
FIG. 14 is a top perspective view of the rectangular joint on the rear of the trailer with the torsion springs in lieu of the gas spring.
Figure 15:
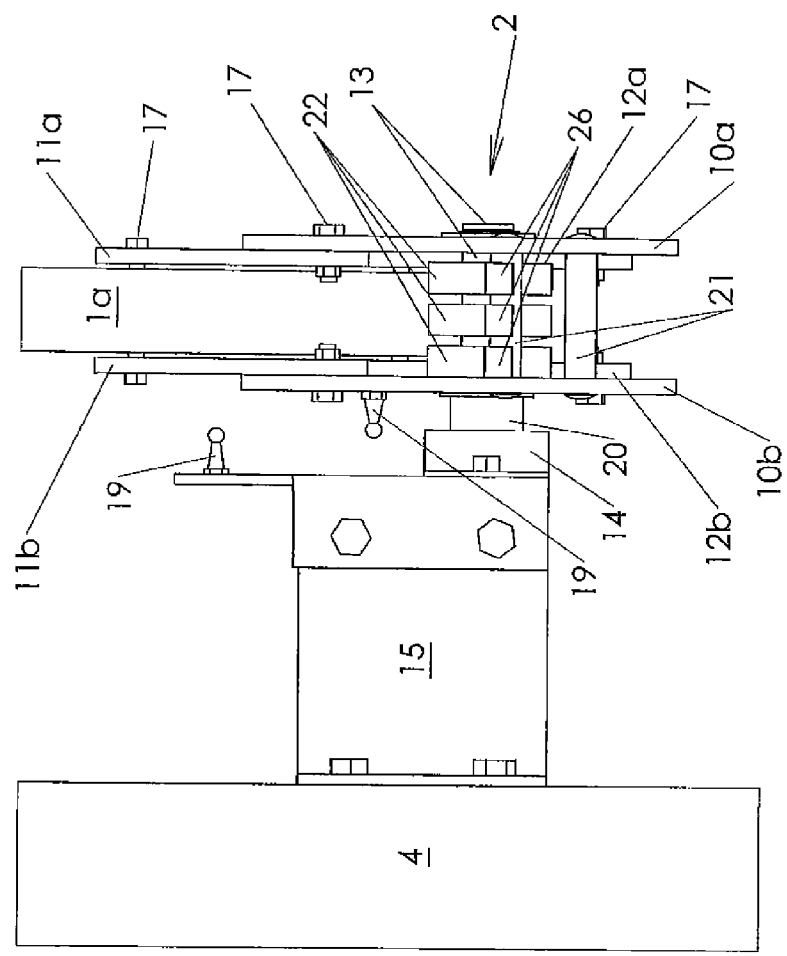
FIG. 15 is a left side view of the rectangular joint on the rear of the trailer with the torsion springs in lieu of the gas spring.
Figure 16:
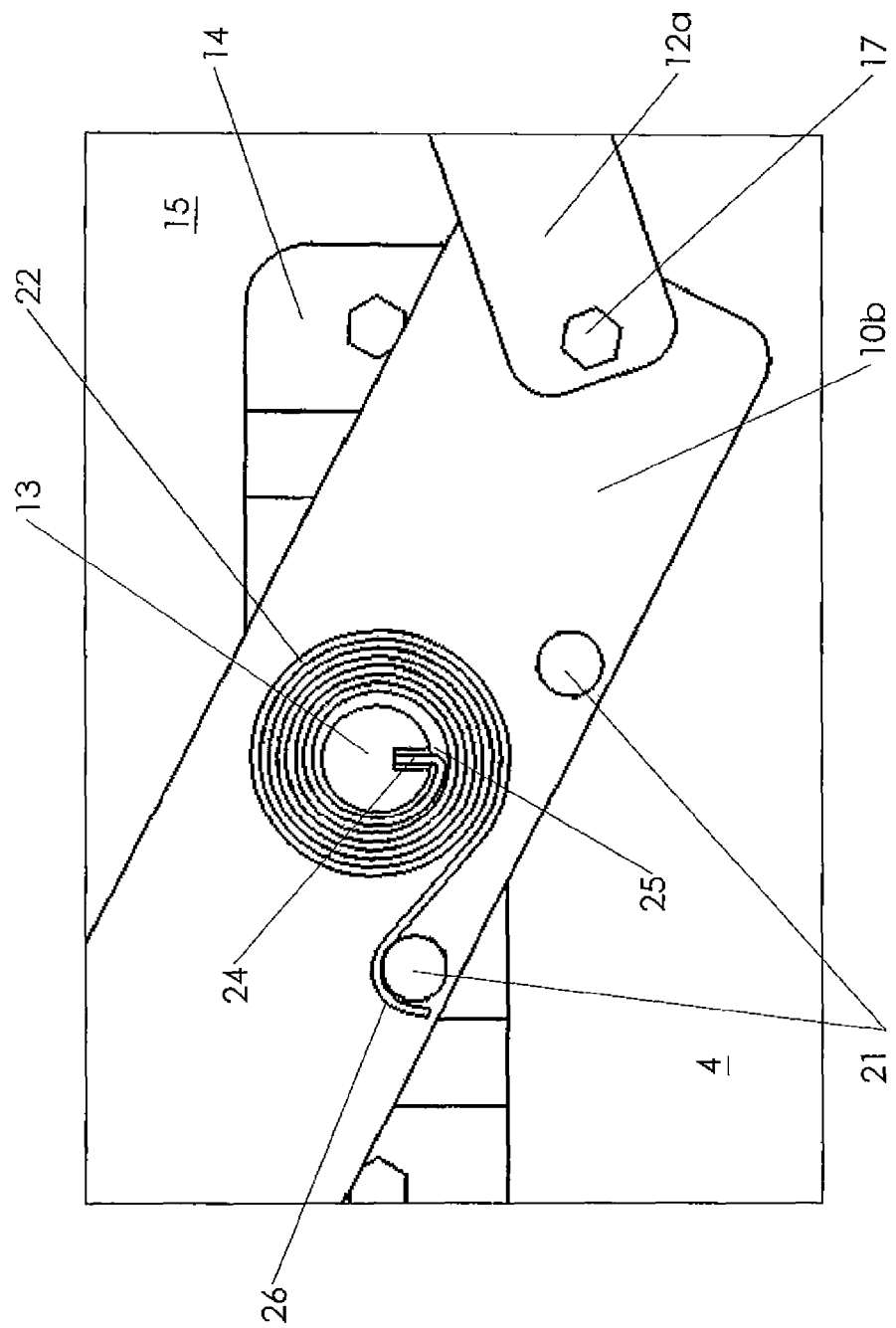
FIG. 16 is a detail view of the torsion spring and axle with the first axle support member omitted for clarity.

FIGS. 14-16 illustrate an alternate embodiment in which torsion springs 22 are used in lieu of the gas spring 16. In this embodiment, the gas spring 16 is removed from the extensions 19, and three torsion springs 22 are placed on the axle 13 in the configuration shown in FIGS. 14-16. (For a direct comparison of the two alternate embodiments, compare FIG. 7 to FIG. 15.) Note that although three torsion springs are shown, the present invention is not limited to any particular number of torsion springs.

With this embodiment, the inner ends 24 of the torsion springs 22 are inserted into a notch 25 in the axle 13 (see FIG. 16), thereby preventing the torsion spring 22 from rotating about the axle 13, and the outer ends 26 of the torsion springs wrap around the spacer 21 that is closest to the first support member 11a (one spacer 21 is closer to the first support member 11a than the other spacer). In this manner, the torsion spring provides tension as the tarp cover 5 is extended and retracted, thereby creating a smoother movement of the main arm 1. (Note that FIG. 16 is the same view as shown in FIG. 6 but with the axle support member 10a omitted.)

Figure 17:
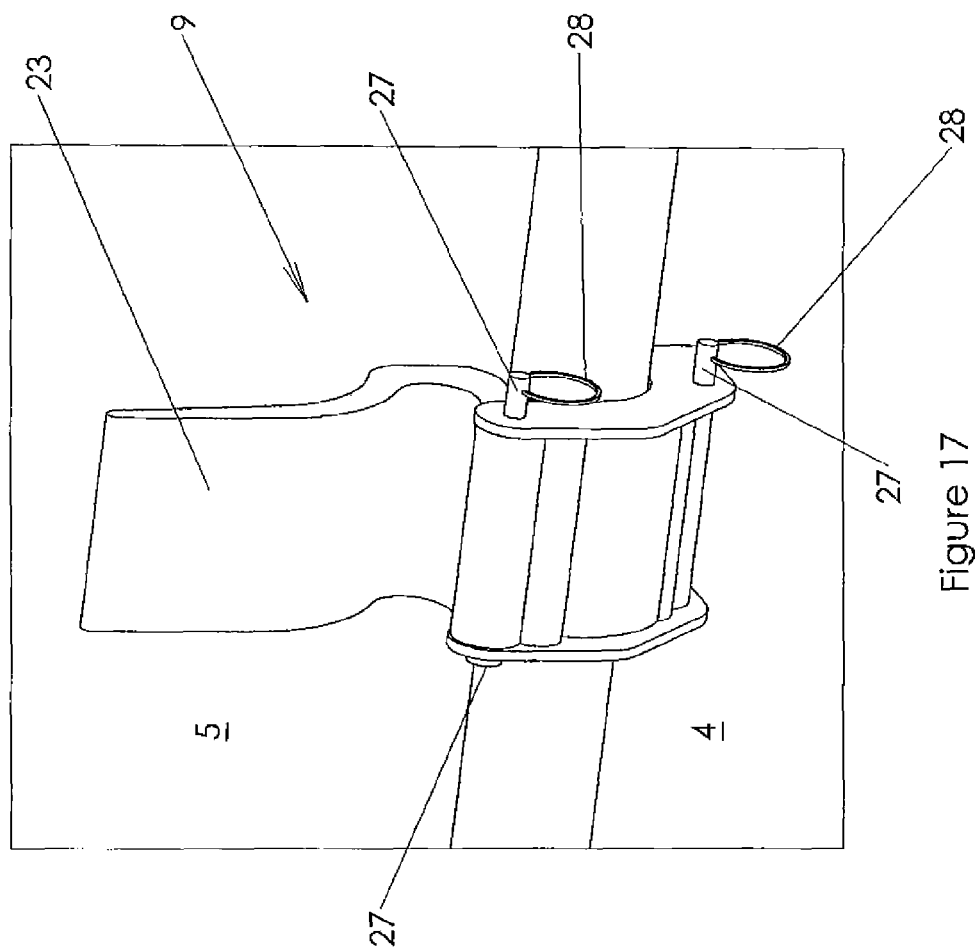
FIG. 17 is a detail view of the cleat of the present invention.

FIG. 17 is a detail view of the cleat 9 of the present invention. As shown in this figure, the cleat 9 is preferably held into place with pins 27 and clips 28. The present invention, however, is not limited to any particular method of securing the tarp cover 5 to the top of the grain trailer 4 on the side opposite to that of the ledge 24, as long as there is a part similar to the upward leg 23 that will stop the roll bar 7 from moving.

Figure 18:
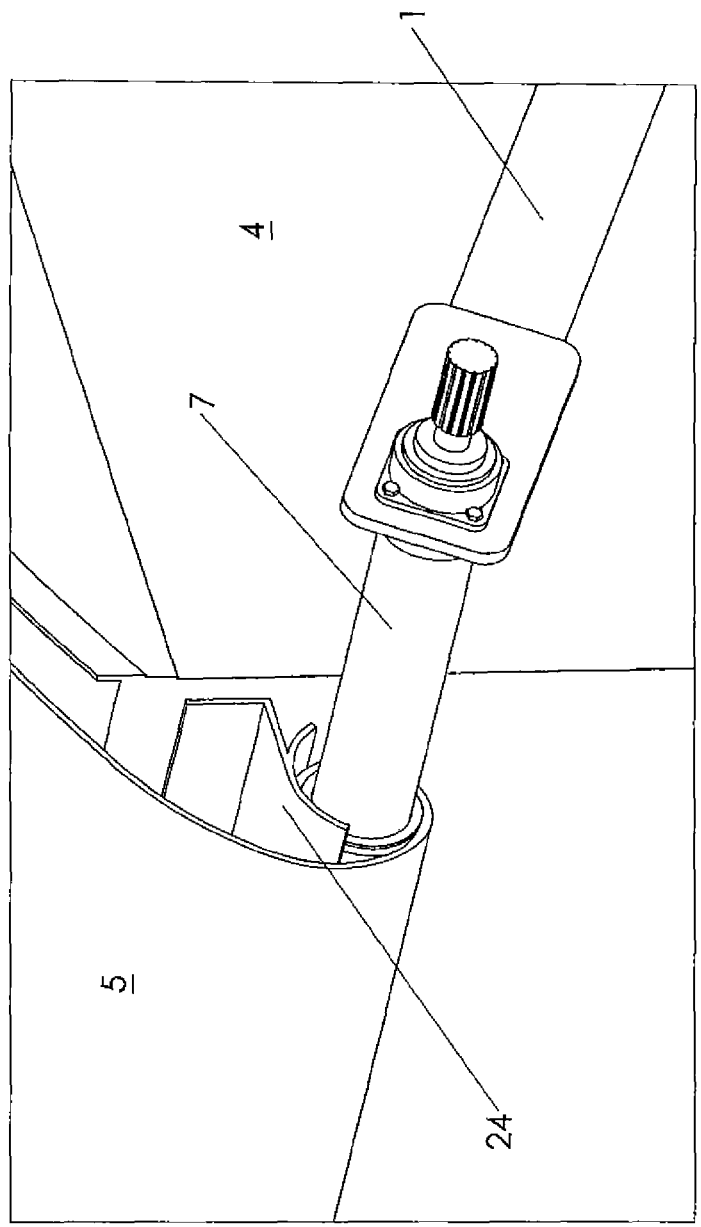
FIG. 18 is a detail view of the ledge of the present invention shown from the rear of the trailer.

FIG. 18 is a detail view of the ledge of the present invention shown from the rear of the trailer. The present invention may be provided as a complete system (with the tarp cover 5, roll bar 7 and cleats 9) or as a retrofit to an existing tarp cover system (without the tarp cover 5, roll bar 7 and cleats 9).

Figure 19:
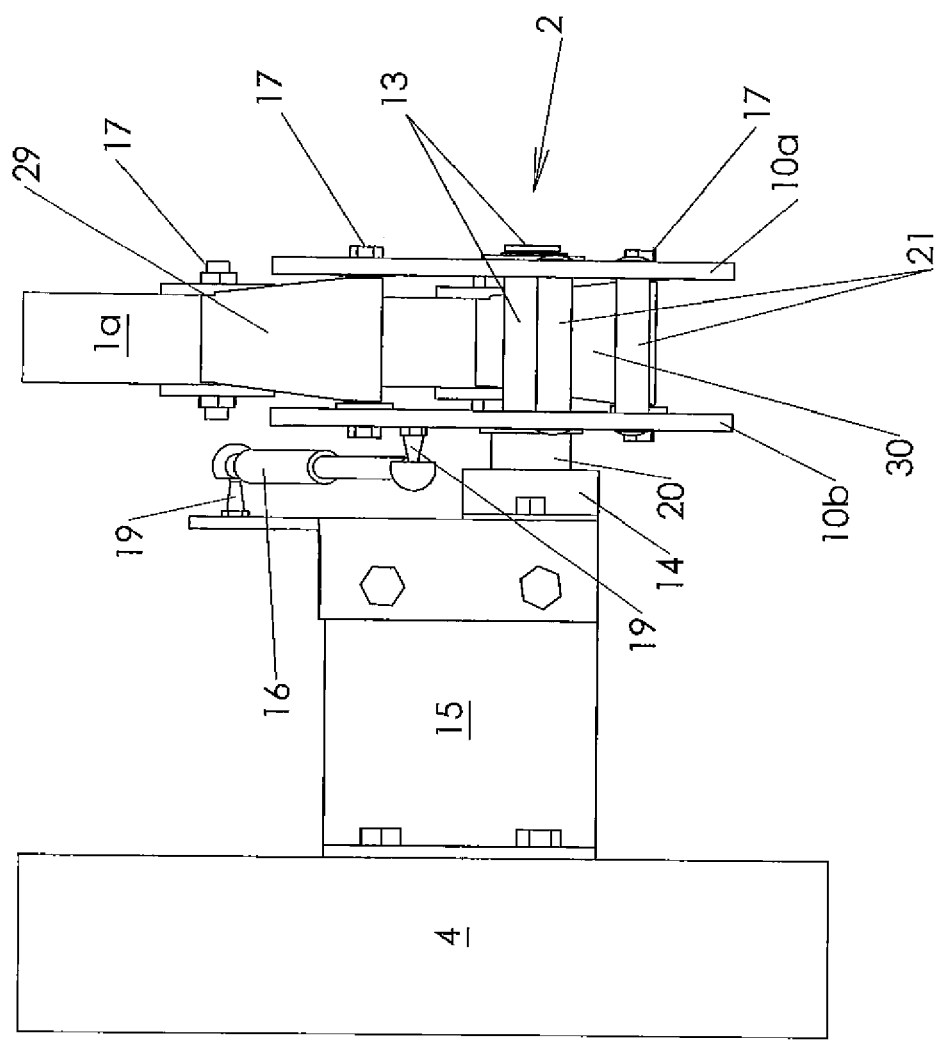
FIG. 19 is a right side view of the rectangular joint on the rear of the trailer shown with an alternate embodiment of the first and second support members.
Figure 20:
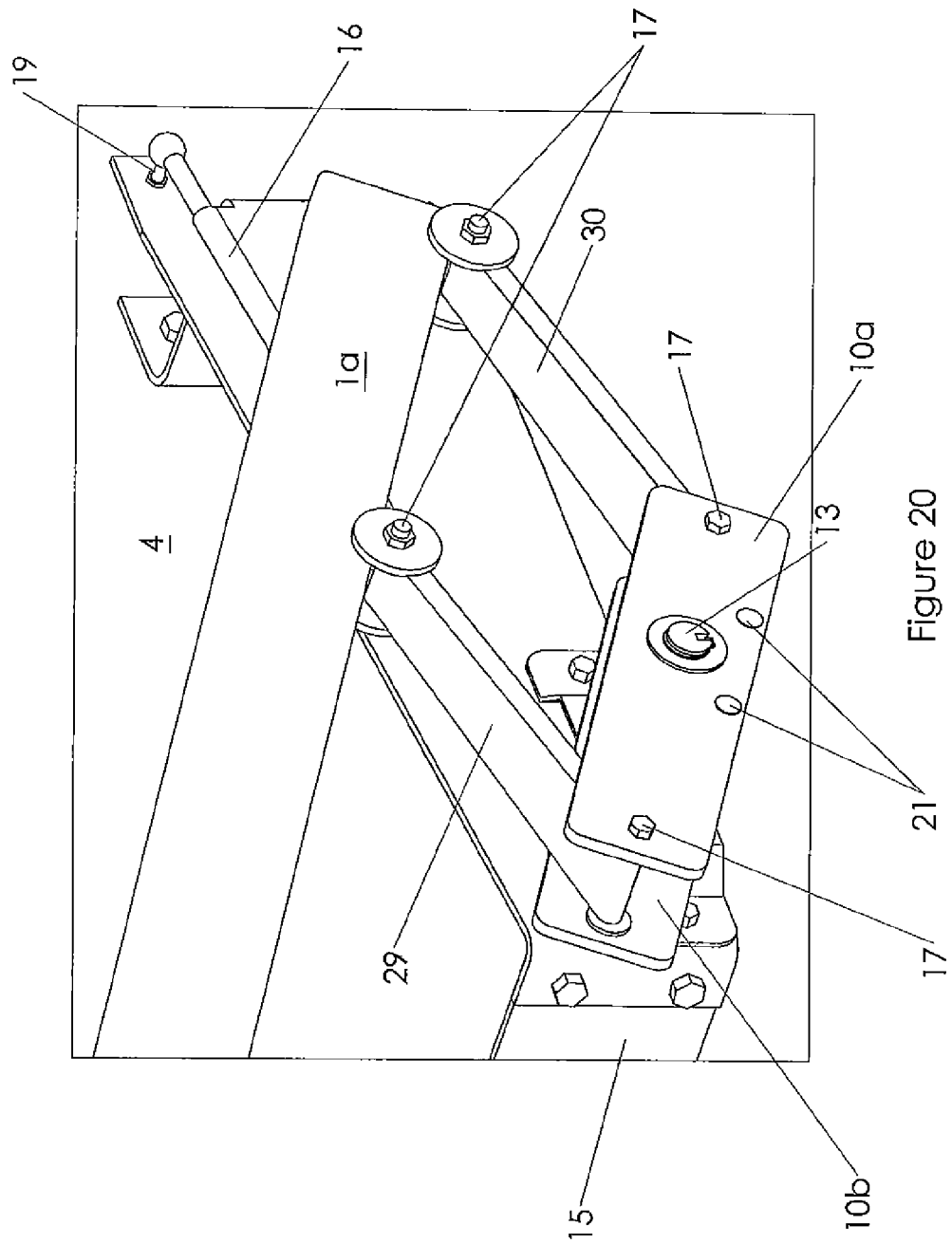
FIG. 20 is a perspective view of the rectangular joint on the rear of the trailer shown with an alternate embodiment of the first and second support members.

FIGS. 19 and 20 show an alternate embodiment in which the two first support members 11a, 11b are replaced with a single first support member 29. Similarly, the two second support members 12a, 12b are replaced with a single second support member 30. As shown in these figures, the first support member 29 is pivotally attached to the bottom end 1a of the main arm 1 on one end and to the axle support members 10a, 10b on the other end. The second support member 30 is pivotally attached to the bottom end 1a of the main arm 1 on one end and to the axle support members 10a, 10b on the other end. In this embodiment, the first support member is vertically parallel to the second support member, as shown, and the distance between the point at which the first support member 29 is connected to the bottom portion 1a of the main arm 1 and the point at which the second support member 30 is connected to the bottom portion 1a of the main arm 1 is equal to the distance between the point at which the first support member 29 is connected to the axle support members 10a, 10b and the point at which the second support member 30 is connected to the two axle support members 10a, 10b. In yet another embodiment, the two first support members 11a, 11b could be connected to each other with a bracket (not shown), as could the two second support members 12a, 12b.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A trailer tarp cover system comprising:
a main arm with a distal end and a bottom portion;
a rectangular joint comprised of the bottom portion of the main arm, two axle support members each having two ends, two first support members each having two ends, and two second support members each having two ends;
a gas spring having two ends; and
a motor located on the distal end of the main arm and having a motor shaft that is connected to a tarp roll bar;
wherein the two first support members are roughly horizontally parallel to one another and are pivotally attached to the bottom portion of the main arm on one end and to the two axle support members on the other end;
wherein the two second support members are roughly horizontally parallel to one another and are pivotally attached to the bottom portion of the main arm on one end and to the two axle support members on the other end;
wherein the two axle support members are horizontally parallel to one another and are pivotally attached to one of the two first support members on one end and to one of the two second support members on the other end;
wherein the axle support members are vertically parallel to the main arm;
wherein the two first support members are the same length as and vertically parallel to the two second support members;
wherein the gas spring is attached to one of the two axle support members on one end and to a main bracket on the other end;
wherein the main bracket is attached to a trailer; and
wherein an axle extends through both axle support members and is welded to an axle support bracket that is fixedly attached to the main bracket.

2. A trailer tarp cover system comprising:
a main arm with a distal end and a bottom portion;
a rectangular joint comprised of the bottom portion of the main arm, two axle support members each having two ends, two first support members each having two ends, and two second support members each having two ends;
one or more torsion springs each having two ends; and
a motor located on the distal end of the main arm and having a motor shaft that is connected to a tarp roll bar;
wherein the two first support members are roughly horizontally parallel to one another and are pivotally attached to the bottom portion of the main arm on one end and to the two axle support members on the other end;
wherein the two second support members are roughly horizontally parallel to one another and are pivotally attached to the bottom portion of the main arm on one end and to the two axle support members on the other end;
wherein the two axle support members are horizontally parallel to one another and are pivotally attached to one of the two first support members on one end and to one of the two second support members on the other end;
wherein the axle support members are vertically parallel to the main arm;
wherein the two first support members are the same length as and vertically parallel to the two second support members;
wherein the main bracket is attached to a trailer;
wherein an axle extends through both axle support members and is welded to an axle support bracket that is fixedly attached to the main bracket;
wherein the torsion springs are mounted on the axle between the two axle support members; and
wherein one end of each torsion spring member is secured to the axle and the other end of each torsion spring member wraps around a spacer located between the two axle support members.

3. A trailer tarp cover system comprising:
a main arm with a distal end and a bottom portion;
a rectangular joint comprised of the bottom portion of the main arm, two axle support members each having two ends, a first support member with a first end and a second end, and a second support member with a first end and a second end;
a gas spring having two ends; and
a motor located on the distal end of the main arm and having a motor shaft that is connected to a tarp roll bar;
wherein the first end of the first support member is pivotally attached to the bottom portion of the main arm, and the second end of the first support member is pivotally attached to the two axle support members;
wherein the first end of the second support member is pivotally attached to the bottom portion of the main arm, and the second end of the second support member is pivotally attached to the two axle support members;
wherein the two axle support members are horizontally parallel to one another and are pivotally attached to the second end of the first support member on one end and to the second end of the second support member on the other end;
wherein the axle support members are vertically parallel to the main arm;
wherein the first support member is the same length as and vertically parallel to the second support member;
wherein the gas spring is attached to one of the two axle support members on one end and to a main bracket on the other end;
wherein the main bracket is attached to a trailer; and wherein an axle extends through both axle support members and is welded to an axle support bracket that is fixedly attached to the main bracket.

4. A trailer tarp cover system comprising:

a main arm with a distal end and a bottom portion;

a rectangular joint comprised of the bottom portion of the main arm, two axle support members each having two ends, a first support member with a first end and a second end, and a second support member with a first end and a second end;

one or more torsion springs each having two ends; and a motor located on the distal end of the main arm and having a motor shaft that is connected to a tarp roll bar;

wherein the first end of the first support member is pivotally attached to the bottom portion of the main arm, and the second end of the first support member is pivotally attached to the two axle support members;

wherein the first end of the second support member is pivotally attached to the bottom portion of the main arm, and the second end of the second support member is pivotally attached to the two axle support members;

wherein the two axle support members are horizontally parallel to one another and are pivotally attached to the second end of the first support member on one end and to the second end of the second support member on the other end;

wherein the axle support members are vertically parallel to the main arm;

wherein the first support member is the same length as and vertically parallel to the second support member;

wherein the main bracket is attached to a trailer;

wherein an axle extends through both axle support members and is welded to an axle support bracket that is fixedly attached to the main bracket;

wherein the torsion springs are mounted on the axle between the two axle support members; and wherein one end of each torsion spring member is secured to the axle and the other end of each torsion spring member wraps around a spacer located between the two axle support members.

* * * * *